(12) United States Patent
Shun

(10) Patent No.: US 6,887,082 B2
(45) Date of Patent: May 3, 2005

(54) LAPAROSCOPIC TRAINER

(75) Inventor: Albert Shun, Westmead (AU)

(73) Assignee: The Royal Alexandra Hospital for Children, Westmead (AU)

(*) Notice: Subject to any disclaimer, the term of this patent is extended or adjusted under 35 U.S.C. 154(b) by 43 days.

(21) Appl. No.: 10/362,432

(22) PCT Filed: Aug. 22, 2001

(86) PCT No.: PCT/AU01/01038
§ 371 (c)(1),
(2), (4) Date: May 15, 2003

(87) PCT Pub. No.: WO02/17277
PCT Pub. Date: Feb. 28, 2002

(65) Prior Publication Data
US 2004/0033476 A1 Feb. 19, 2004

(30) Foreign Application Priority Data
Aug. 23, 2000 (AU) .................................. PQ9627
Mar. 16, 2001 (AU) .................................. PR3782

(51) Int. Cl.$^7$ ............................................. G09B 23/28
(52) U.S. Cl. ...................................... 434/267; 434/272
(58) Field of Search ............................... 434/262, 267, 434/268, 270, 271

(56) References Cited
U.S. PATENT DOCUMENTS

| | | | | |
|---|---|---|---|---|
| 4,058,910 A | * | 11/1977 | Funk ........................... 40/381 |
| 5,149,270 A | * | 9/1992 | McKeown ................... 434/262 |
| 5,403,191 A | * | 4/1995 | Tuason ........................ 434/262 |
| 5,722,836 A | * | 3/1998 | Younker ...................... 434/272 |
| 5,909,380 A | * | 6/1999 | Dubois et al. ................ 703/11 |
| 6,485,308 B1 | * | 11/2002 | Goldstein .................... 434/267 |

FOREIGN PATENT DOCUMENTS

| | | |
|---|---|---|
| DE | 197 22 929 C1 | 5/1997 |
| GB | 2 318 202 | 4/1998 |
| WO | WO 97/44768 | 11/1997 |

* cited by examiner

Primary Examiner—Kurt Fernstrom
(74) Attorney, Agent, or Firm—Carol M. LaSalle; Bozicevic, Field & Francis LLP

(57) ABSTRACT

A surgical training device (10) for the practice of surgical techniques. The device (10) comprises an operation area (18) arranged to receive an operable structure and a screening wall (13) having an aperture (21). The wall (13) is positioned relative to the operation area (18) such that the wall prevents direct viewing of the operation area (18) from at least one position (19) external the wall (18). The device further includes an optical system comprising a first mirror (24) and a second mirror (25). The first mirror (24) is arranged to reflect a primary image of the operation area (18) to the second mirror (25) which in turn is arranged to reflect a secondary image of the operation area (18) that is visible from the external position (19). The position and orientation of the mirrors and the aperture (21) is such that only the secondary image of the operation area (18) is visible from the external position (19).

19 Claims, 1 Drawing Sheet

LAPAROSCOPIC TRAINER

FIELD OF THE INVENTION

The present invention relates to a device that assists surgeons to learn and practise endoscopic surgical procedures.

BACKGROUND OF THE INVENTION

Minimally invasive surgical procedures are now often favoured over "open" or conventional surgery due to a lower post-operative morbidity, shorter post-operative stay, less pain, decreased cost and quicker recovery period.

While often favoured for the above reasons, conventional open surgery does have the advantage that the surgeon is presented with a three-dimensional environment to which their eyes are accustomed in everyday living. Further, when the surgeon manipulates the operative instruments, there is a direct visual response to the actions performed by their hands.

In endoscopic procedures, such as a laparoscopic procedure, the operative field is instead perceived as a magnified two-dimensional image seen by way of a video camera and television screen. The result is a disassociation between the surgeon's hand movements and the end result of those movements as visualised on the television screen. This occurs because the surgeon's eyes cannot focus on the spatial orientation of their hands in relation to the actual operative task.

A further significant difference is that the operative field, as viewed in an endoscopic procedure, lacks any depth perception. This adds to the surgeon's difficulty in appropriately positioning the instruments. It, in effect, necessitates the surgeon to retrain his or her eyes to estimate the actual distance between the structures being manipulated.

Surgeons typically require a significant period of training to develop the new set of fine coordinated movements required to perform complicated endoscopic procedures, such as suturing and knot tying. This training typically involves use of relatively expensive and non-portable video and television equipment that provides an image of an operation area being practised upon by the surgeon.

The present invention provides an alternative training device for surgeons to learn and practise endoscopic surgical techniques.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention before the priority date of each claim of this application.

SUMMARY OF THE INVENTION

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The present invention is a surgical training device for use by surgeons, including trainee surgeons. The device is particularly designed to allow surgeons to practise endoscopic procedures where a two dimensional image of the operation area is depicted on a television or monitor screen.

According to one aspect, the present invention is a surgical training device for the practice of surgical techniques on an operable structure, the device comprising:
- an operation area arranged to receive an operable structure;
- a screening wall having a viewing means, the wall being positioned relative to the operation area such that the wall prevents direct viewing of the operation area from at least one position external the wall;
- an optical system comprising a first mirror and at least a second mirror, the first mirror being arranged to reflect a primary image of the operation area to the second mirror which in turn is arranged to reflect a secondary image of the operation area that is visible from said external position via the viewing means.

A surgeon using the device is forced to view the operation area by viewing the reflected two dimensional image of the operation area. The device thereby can be used by a surgeon to practise surgical techniques despite not being able to directly view the operation area.

As used herein, the term operable structure can be taken to be any structure that is suitable for the practice of surgical techniques. For example, the operable structure can comprise an anatomical structure, such as a sample of animal body tissue. In another case, the anatomical structure can be a sample of human tissue thus providing the surgeon with a sample of tissue identical or similar to that that will be encountered in surgery. In another case, the operable structure can be fabricated from a synthetic material designed to replicate the features of an anatomical structure.

In one embodiment, the optical system is adapted to prevent viewing of a primary reflection of the operation area from said external position. In another embodiment, the optical system is adapted to allow viewing of a secondary reflection of the operating area from said external position. In yet another embodiment, the optical system prevents viewing of tertiary and/or higher numbered reflections from said external position. In a still further embodiment, the optical system only allows viewing of the secondary reflection of the operating area from said external position.

In a preferred embodiment, the device includes a chamber surrounding the operation area. The chamber can comprise a box having a base and at least the screening wall. The base can be rectangular with the box having the screening wall, a rear wall and two side walls extending from the front screening wall to the rear wall. At least a portion of the front and rear walls, respectively, can be parallel and the respective side walls can also be parallel. The front wall, rear wall and side wall preferably each extend upwardly from the base to a respective upper end. The respective upper ends of the side walls can be co-planar.

The front screening wall of the chamber is preferably opaque. The front wall is preferably opaque as it is envisaged that a surgeon using the device would use the device when positioned in front of the front wall. The other walls can also be opaque. It is, however, possible that a portion or all of the side walls and the rear wall may be transparent to allow viewing of the operation area from external positions other than said external position. For example, the side walls and/or rear wall may be transparent to allow a trainer or teacher to readily view the operation area during use of the device by a trainee surgeon.

The screening wall preferably comprises a first portion extending upwardly to an upper end from the first side of the base, and a second portion extending upwardly and inwardly from the upper end of the first portion of the screening wall. The second portion also preferably has the same width as the first portion and has an outer face and an inner face. The second portion of the screening wall is preferably adjustably mountable to the first portion. Once mounted, the angle between the second portion and the first portion is preferably variable.

The screening wall preferably includes a viewing means positioned in the second portion thereof that allows visualisation of said reflected image of the operation area provided by the optical system. In a preferred embodiment, the viewing means only allows visualisation of a secondary reflection of the operating area. The viewing means can comprise an aperture in the screening wall. In another embodiment, the viewing means can comprise a polymeric or glass window. The position of the viewing means relative to the first portion of the screening wall is variable by relative movement of the second portion of the screening wall.

Respective support walls preferably extend upwardly from the respective side walls to the second portion. The support walls are also preferably opaque. The support walls can be integrally formed with the second portion of the screening wall or removable therefrom.

The screening wall also preferably includes at least one instrument portal. The screening wall preferably has two instrument portals but a greater number can be envisaged. The other walls of the chamber, such as the front wall, can also each include at least one instrument portal. The portals are preferably adapted to allow insertion of surgical endoscopic instruments into the chamber. The portals are preferably adapted to represent the dimensions of typical openings formed in a patient's body during endoscopic surgery. The one or more portals in the screening wall are preferably positioned adjacent or below the viewing means. More preferably, the one or more portals are positioned adjacent or below a lower edge of the viewing means.

The operation area can comprise a tray, dish or other suitable container. The tray is preferably adapted to surround the contents of any tissue operated upon within the tray and substantially prevent spillage of tissue and fluids. In use, the tray is positioned such that its reflected image is visible from said external position through use of the optical system.

The optical system preferably comprises a first mirror and at least a second mirror. The first mirror is preferably positioned on the inner face of the screening wall. Movement of the screening wall results in movement of the first mirror mounted thereto. In a preferred embodiment, the first mirror will be positioned on the inner face below the viewing means. The first mirror is preferably positioned and oriented to reflect an inverted image of the operation area towards the rear wall of the chamber. The first mirror can be a magnifying mirror.

The second mirror is preferably positioned at or adjacent the rear wall of the chamber. The second mirror can further be mounted on the base of the device. The second mirror is preferably positioned and oriented to reflect the inverted image provided by the first mirror towards the viewing means in the screening wall. The second mirror reorientates the inverted image of the operation area provided by the first mirror. The second mirror is also preferably a magnifying mirror. The second mirror preferably magnifies the image by a factor of two (2). Other magnification factors can be envisaged. The second mirror is preferably adjustably mountable within the device to allow visualisation of only a secondary reflection of the operating area at said position through the viewing means.

In another embodiment of the invention, the device can include a light source. The light source can have an internal power supply such as a battery or can be externally powered. The light source preferably is adapted to provide a level of illumination similar to that available to a surgeon when performing actual endoscopic procedures on a patient.

The device according to the present invention is preferably compact and portable. The device can preferably be dismantled and readily transported in a case. This allows the user to readily set up and use the device in any convenient location.

According to a further aspect, the present invention is a method of practising one or more surgical techniques comprising the steps of:

assembling the device as defined herein and positioning an anatomical structure in the operation area thereof;

adjusting the primary mirror and/or the second mirror such that a secondary image of the anatomical structure reflected from the second mirror is visible through the viewing means; and practising at least one surgical technique on the anatomical structure while viewing the secondary image of the anatomical structure through the viewing means.

BRIEF DESCRIPTION OF THE DRAWINGS

By way of example only, a preferred embodiment of the invention is now described with reference to the accompanying drawing, in which.

PREFERRED MODE OF CARRYING OUT THE INVENTION

Figure 1:
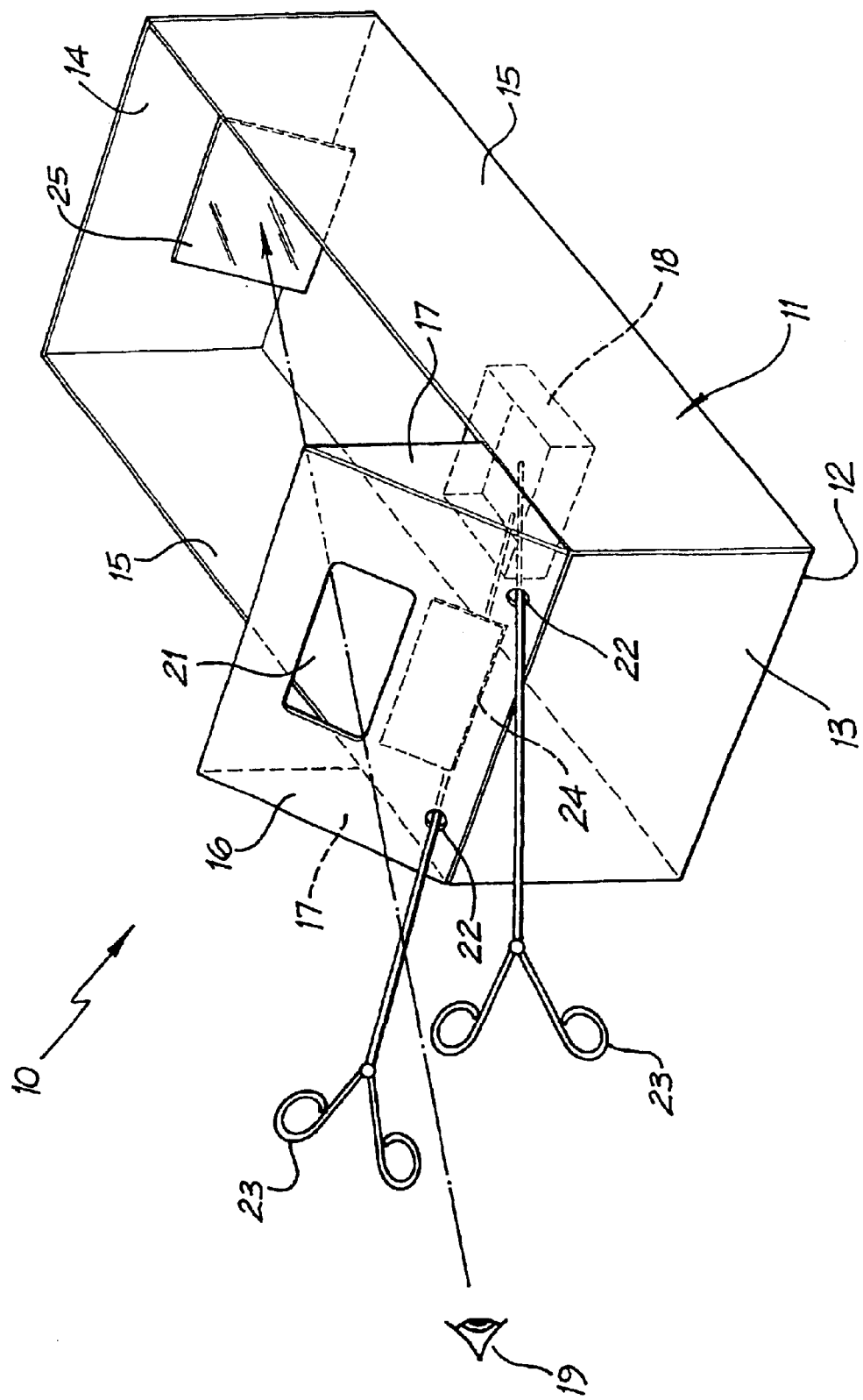
FIG. 1 is a perspective view of the training device according to the present invention.

A portable device for surgeons to learn and practise endoscopic surgical procedures is depicted generally as 10 in FIG. 1.

The device 10 comprises a chamber 11 having a base 12, a first portion 13 of a front screening wall, a rear wall 14 and side walls 15. In the depicted embodiment, the base and walls are formed from an opaque material. It will be appreciated that in other embodiments, at least the rear wall 14 and at least a portion of the respective side walls 15 could be formed from a transparent material to allow ready viewing of the interior of the chamber from the side or rear of the chamber 11. The front wall 13, rear wall 14 and side walls 15 are removably mounted to the base 12 to allow ready dismantling of the chamber 11 for transport.

Extending upwardly and inwardly from the upper edge of the front wall 13 is a second portion 16 of the screening wall. The second portion 16 of the wall is adjustably supported by the upper edge of the first portion 13 of the front wall and two support walls 17. The adjustable mounting allows the angle of the second portion 16 relative to the upper edge of the first portion 13 to be adjusted as required. The second portion 16 and the respective support walls 17 are opaque in the depicted embodiment. The position and orientation of the second portion 16 of the screening wall is such so as to prevent direct visualisation of the operation area, depicted as a tray 18 in the drawing, from the normal external position of the eyes of the trainee using the device 10, represented by eye 19.

In the depicted embodiment, the second portion 16 of the screening wall has a viewing portal 21, comprising an aperture in the wall, that allows direct visualisation of the second mirror 25. The second portion 16 of the screening wall also has two instrument portals 22 extending through the wall immediately above the upper edge of the first portion 13 of the wall and below the viewing portal 21. Other positions and different numbers of instrument portals can be envisaged. As depicted, the portals 22 allow the surgeon to insert endoscopic instruments 23, such as trocars, cannulas, clamps, and scissors, into the chamber 11 so that they can manipulate tissue, or another operable structure, positioned in the tray 18.

Positioned on the inner face of the second portion 16 of the screening wall is a first mirror 24 (depicted in phantom). The first mirror 24 is oriented to reflect light that has travelled forwardly from the tray 18 rearwardly back towards the rear wall 14 of the chamber 11. As such, the first mirror 24 reflects an inverted primary reflected image of the tray 18 and its contents towards the second mirror 25.

The second mirror 25 is positioned and oriented to reflect the inverted image back through the viewing portal 21 in its correct orientation (ie. a secondary image) such that it can be viewed by the surgeon when they are at position 19. In the depicted embodiment, the second mirror 25 also magnifies the image by a factor of two (2). The angle made between the second mirror 25 and the base 12 is adjustable to allow a user to ensure that only a secondary image of the contents of the tray 18 is viewable when the user has their eye at position 19. The orientation of the mirrors and the position of the aperture 21 in the screening wall ensures that direct visualisation of the tray 18, and viewing of a primary image or tertiary or greater image from the second mirror 25 is not visible when the surgeon's eye is at position 19.

The present device 10 serves to provide a surgeon with a two-dimensional secondary image of an operation area 18 through use of a first mirror 24 and second mirror 25. By only being able to view a two dimensional image at a position separated from the operation area defined by tray 18, the surgeon is required to operate in an equivalent manner to that necessary in actual endoscopic surgery.

When not in use or while being transported, the device 10 can be stored in a carry case. When required, the components of the device 10 can be removed from the case and assembled. Once the chamber 11 is assembled and the first mirror 24 and second mirror 25 are appropriately aligned to allow visualisation of a secondary reflection of tray 18 through portal 21, the device 10 is ready for use. An appropriate sample of body tissue, human or animal, or a synthetic operable structure, can be placed in the tray 18 and then used for endoscopic surgical practise as described above.

When the practise session is complete, the tissue can be removed from the tray 18 and the chamber 11 cleaned. If desired, the device 10 can then be dismantled and packed away until next required.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A surgical training device for the practice of surgical techniques on an operable structure, the device comprising:
    an operation area arranged to receive an operable structure;
    a screening wall having means for viewing, the wall being positioned relative to the operation area such that the wall prevents direct viewing of the operation area from at least one position external the wall; and
    an optical system comprising a first mirror and at least a second mirror, the first mirror being arranged to reflect a primary image of the operation area to the second mirror which in turn is arranged to reflect a secondary image of the operation area that is visible from said external position via the means for viewing, the orientation of the second mirror being adjustable relative to the operation area and the first mirror such that any primary image or tertiary or greater image reflected from the second mirror is not visible via the means for viewing of the screening wall.

2. A surgical training device of claim 1 wherein the device further comprises a chamber surrounding the operation area, the chamber comprising a base and at least the screening wall extending upwardly from a first side of said base.

3. A surgical training device of claim 2 wherein the chamber further comprises a rear wall extending upwardly from a second side of the base distal the first side, and two opposed side walls extending from the screening wall to the rear wall.

4. A surgical training device of claim 3 wherein the screening wall of the chamber is opaque.

5. A surgical training device of claim 4 wherein the screening wall comprises a first portion extending upwardly to an upper end from the first side of the base, and a second portion extending upwardly and inwardly from the upper end of the first portion of the screening wall.

6. A surgical training device of claim 5 wherein the second portion of the screening wall has an outer face and an inner face and is adjustably mountable to the first portion.

7. A surgical training device of claim 6 wherein the means for viewing is in the second portion of the screening wall.

8. A surgical training device of claim 7 wherein the means for viewing comprises an aperture in the second portion of the screening wall.

9. A surgical training device of claim 8 wherein the means for viewing comprises a window in the second portion of the screening wall.

10. A surgical training device of claim 6 wherein the screening wall has at least on instrument portal formed therein.

11. A surgical training device of claim 10 wherein the at least one instrument portal is in the second portion of the screening wall.

12. A surgical training device of claim 11 wherein the one or more portals in the screening wall are position adjacent or below the means for viewing.

13. A surgical training device of claim 6 wherein the first mirror is positioned on the inner face of the second portion of the screening wall.

14. A surgical training device of claim 13 wherein the first mirror is positioned on the inner face of the second portion of the screening wall below the means for viewing.

15. A surgical training device of claim 1 wherein the first mirror is a magnifying mirror.

16. A surgical training device of claim 1 wherein the second mirror is a magnifying mirror.

17. A surgical device of claim 16 wherein the second mirror magnifies the image by a factor of two.

18. A method of practising one or more surgical techniques on an operable structure comprising the steps of:
    assembling a device comprising:
        an operation area arranged to receive an operable structure;
        a screening wall having a means for viewing, the wall being positioned relative to the operation area wherein the wall prevents direct viewing of the operation area from at least one position external the wall; and an optical system comprising a first mirror and at least a second mirror, the first mirror being arranged to reflect a primary image of the operation area to the second mirror which in turn is arranged to reflect a secondary image of the operation area that is visible from said external position via the means for viewing, the orientation of the second mirror being adjustable relative to the operation area and the first mirror wherein any primary image or tertiary or greater image reflected from the second mirror is not visible via the means for viewing of the screening wall;

positioning an operation structure in the operation area thereof;

adjusting the primary mirror and/or the second mirror such that a secondary image of the operable structure reflected from the second mirror is visible through the means for viewing; and practicing at least one surgical technique on the operable structure while viewing the secondary image of the operable structure through the means for viewing.

19. A surgical training device for the practice of surgical techniques on an operable structure, the device comprising:

an operation area arranged to receive an operable structure;

a screening wall having a window or aperture therein, the screening wall being positioned relative to the operation area wherein the screening wall prevents direct viewing of the operation area from at least one position external the wall; and an optical system comprising a first mirror and at least a second mirror, the first mirror being arranged to reflect a primary image of the operation area to the second mirror which in turn is arranged to reflect a secondary image of the operation area that is visible from said external position via the window or aperture, the orientation of the second mirror being adjustable relative to the operation area and the first mirror wherein any primary image or tertiary or greater image reflected from the second mirror is not visible via the window or aperture of the screening wall.

* * * * *